United States Patent
Xia et al.

(10) Patent No.: US 12,550,109 B2
(45) Date of Patent: Feb. 10, 2026

(54) VEHICLE AND DEVICE POSITIONING METHOD

(71) Applicant: CHERY AUTOMOBILE CO., LTD., Wuhu (CN)

(72) Inventors: Cui Xia, Wuhu (CN); Aoting Wei, Wuhu (CN); Fei Wang, Wuhu (CN); Chuansu Wang, Wuhu (CN)

(73) Assignee: CHERY AUTOMOBILE CO., LTD., Wuhu (CN)

( * ) Notice: Subject to any disclaimer, the term of this patent is extended or adjusted under 35 U.S.C. 154(b) by 361 days.

(21) Appl. No.: 18/248,158

(22) PCT Filed: Oct. 9, 2021

(86) PCT No.: PCT/CN2021/122912
§ 371 (c)(1),
(2) Date: Apr. 6, 2023

(87) PCT Pub. No.: WO2022/078267
PCT Pub. Date: Apr. 21, 2022

(65) Prior Publication Data
US 2023/0379868 A1    Nov. 23, 2023

(30) Foreign Application Priority Data
Oct. 14, 2020 (CN) .......................... 202011099321.3

(51) Int. Cl.
*H04W 64/00* (2009.01)

(52) U.S. Cl.
CPC ................ *H04W 64/003* (2013.01)

(58) Field of Classification Search
CPC ..................................................... H04W 4/48
See application file for complete search history.

(56) References Cited

U.S. PATENT DOCUMENTS 9,894,492 B1    2/2018 Elangovan et al.
2004/0167690 A1*  8/2004 Yamada .............. G01M 17/007
                                                    455/423

(Continued)

FOREIGN PATENT DOCUMENTS

CN    101973235 A    2/2011
CN    101980034 A    2/2011

(Continued)

OTHER PUBLICATIONS

International Search Report of the International Searching Authority for State Intellectual Property Office of the People's Republic of China in PCT application No. PCT/CN2021/122912 issued on Jan. 6, 2022, which is an International application to which this application claims priority.

(Continued)

*Primary Examiner* — Wen W Huang
(74) *Attorney, Agent, or Firm* — Kolitch Romano Dascenzo Gates LLP

(57) ABSTRACT

A method for determining a position of a device includes: providing position detection pins on Bluetooth slave modules, and when the Bluetooth slave modules are installed, connecting the position detection pins of the Bluetooth slave modules at different installation positions to different level signal pins such that the level situations of the position detection pins of different Bluetooth slave modules are different; and comparing by a Bluetooth master module or the Bluetooth slave modules the level situations of the position detection pins of the Bluetooth slave modules with a pre-stored position level table, and identifying installation position information corresponding to the Bluetooth slave modules, and determining a position of the target device based on the signal strength value sent by each of the (Continued)

plurality of Bluetooth slave modules and the installation position of each of the plurality of Bluetooth slave modules.

10 Claims, 6 Drawing Sheets

(56) References Cited

U.S. PATENT DOCUMENTS

| | | | | |
|---|---|---|---|---|
| 2006/0232052 | A1* | 10/2006 | Breed | B60R 21/013 |
| | | | | 280/735 |
| 2011/0031809 | A1* | 2/2011 | Yoshida | H02G 3/0462 |
| | | | | 29/854 |
| 2013/0110433 | A1 | 5/2013 | Gotschall et al. | |
| 2014/0118193 | A1 | 5/2014 | Reichenbach et al. | |
| 2015/0161834 | A1 | 6/2015 | Spahl et al. | |
| 2016/0210794 | A1* | 7/2016 | Fazi | B60W 10/00 |
| 2016/0248905 | A1* | 8/2016 | Miller | H04M 1/724098 |
| 2017/0070862 | A1* | 3/2017 | Buttolo | H04W 4/029 |
| 2017/0155679 | A1* | 6/2017 | Choi | G06F 3/0623 |
| 2017/0208438 | A1* | 7/2017 | Dickow | H04W 4/40 |
| 2018/0098202 | A1* | 4/2018 | Yang | H04W 4/029 |
| 2018/0219869 | A1 | 8/2018 | Kumar et al. | |
| 2018/0339676 | A1 | 11/2018 | Lazarini et al. | |
| 2019/0248331 | A1* | 8/2019 | Salah | G01S 5/0284 |

FOREIGN PATENT DOCUMENTS

| | | |
|---|---|---|
| CN | 103174336 A | 6/2013 |
| CN | 103688188 A | 3/2014 |
| CN | 104038867 A | 9/2014 |
| CN | 104648282 A | 5/2015 |
| CN | 104735624 A | 6/2015 |
| CN | 109466505 A | 3/2019 |
| CN | 109699004 A | 4/2019 |
| CN | 109782153 A | 5/2019 |
| CN | 109870715 A | 6/2019 |
| CN | 110753392 A | 2/2020 |
| CN | 112423279 A | 2/2021 |
| RU | 2673329 C2 | 11/2018 |
| RU | 2695510 C2 | 7/2019 |
| WO | 2013040941 A1 | 3/2013 |
| WO | 2019192907 A1 | 10/2019 |

OTHER PUBLICATIONS

The State Intellectual Property Office of People's Republic of China, First Office Action in Patent Application No. CN202011099321.3 issued on Aug. 12, 2021, which is a foreign counterpart application corresponding to this U.S. Patent Application, to which this application claims priority.

The State Intellectual Property Office of People's Republic of China, Second Office Action in Patent Application No. CN202011099321.3 issued on Nov. 3, 2021, which is a foreign counterpart application corresponding to this U.S. Patent Application, to which this application claims priority.

China National Intellectual Property Administration, Notification to Grant Patent Right for Invention of Chinese Application No. 202011099321.3 issued on Feb. 28, 2022, which is foreign counterpart application of this US application.

Extended European Search Report Communication Pursuant to Rule 62 EPC for European Application No. 21879312.3 dated Jan. 25, 2024, which is a foreign counterpart application to this application.

Examination report of IR application No. 140250140003000423 issued on Feb. 26, 2024.

Federal Institute of Industrial Property (ROSPATENT), Decision on Grant of Russian application No. 2023110650/07 issued on Sep. 21, 2023, which is foreign counterpart application of this US application.

* cited by examiner

VEHICLE AND DEVICE POSITIONING METHOD

CROSS-REFERENCE TO RELATED APPLICATIONS

The present application is a U.S. national stage of international application No. PCT/CN2021/122912, filed on Oct. 9, 2021, which claims priority to Chinese Patent Application No. 202011099321.3, filed on Oct. 14, 2020 and entitled "METHOD FOR IDENTIFYING INSTALLATION POSITION OF BLUETOOTH SLAVE MODULE", the disclosures of which are incorporated herein by reference in their entireties.

TECHNICAL FIELD

The present application relates to the field of application of automotive electronic systems, and in particular, to a vehicle and a device positioning method.

BACKGROUND OF THE INVENTION

With development of an intelligent connected vehicle technology, especially popularization and application of a Bluetooth digital key technology, convenience and sense of technology provided to vehicle owners are increasingly prominent. Hardware of a Bluetooth key is mainly a Bluetooth module controller installed on a vehicle. To implement accurate positioning, most of the major vehicle manufacturers use one Bluetooth master module together with a plurality of Bluetooth slave modules. The Bluetooth slave modules are mainly used for auxiliary positioning. Received signal strength value indicator (RSSI) values at different positions of the vehicle are transmitted to the Bluetooth master module. Then, the Bluetooth master module achieves accurate positioning through a positioning algorithm. The Bluetooth master module needs to know the positions (namely, installation positions on the vehicle) of the Bluetooth slave modules to make positioning more accurate.

At present, a solution for distinguishing installation positions of mixed slave modules can be implemented by adding a diagnostic learning process to a program of an electrical inspection device in a production line. However, this solution requires a modification to the device in the production line, resulting in modification costs. Addition of a detection process also has specific impact on a production pace. Therefore, it is necessary and significant to develop a solution for distinguishing positions of mixed Bluetooth slave modules.

SUMMARY OF THE INVENTION

Embodiments of the present application provide a vehicle to identify an installation position of a Bluetooth slave module conveniently and accurately. The technical solutions are as follows.

According to a first aspect, a method for identifying an installation position of a Bluetooth slave module is provided as follows. Position detection pins are disposed on Bluetooth slave modules. The position detection pins of the Bluetooth slave modules at different installation positions are connected to different level signal pins when the Bluetooth slave modules are installed such that level conditions of the position detection pins of different Bluetooth slave modules are different. Each of the Bluetooth slave modules sends the level condition of the position detection pin of the Bluetooth slave module to a Bluetooth master module. The Bluetooth master module compares the received level condition of the position detection pin of the Bluetooth slave module with a prestored position-level table to identify installation position information corresponding to the Bluetooth slave module. Alternatively, the Bluetooth slave module compares the level condition of the position detection pin of the Bluetooth slave module with the prestored position-level table to identify the installation position information corresponding to the Bluetooth slave module, and sends the installation position information corresponding to the Bluetooth slave module to the Bluetooth master module. The position-level table is used to represent relationships among the installation positions of the Bluetooth slave modules and the level conditions of the level signal pins of the installation positions.

Further, the level conditions of the level signal pins include a high level and a low level. A quantity of the Bluetooth slave modules is M. A quantity of position detection pins of each of the Bluetooth slave modules is the same and is N. N is an integer greater than or equal to 1. M is an integer greater than 1. A relationship between M and N is as follows: $2^N \geq M$. For example, when there are two Bluetooth slave modules, only one position detection pin needs to be disposed on each Bluetooth slave module. The position detection pins of the two Bluetooth slave modules are respectively set to the high level and the low level through the level signal pins. The level conditions of the position detection pins of the two Bluetooth slave modules are different (respectively the high level and the low level) such that installation positions of the two Bluetooth slave modules can be distinguished based on the level conditions of the position detection pins of the Bluetooth slave modules. For another example, when there are four Bluetooth slave modules, only two position detection pins need to be disposed on each Bluetooth slave module. The two position detection pins of each of the four Bluetooth slave modules are set to the following four level conditions through the level signal pins: 1. high level and high level; 2. high level and low level; 3. low level and high level; and 4. low level and low level. Level combinations of the two position detection pins of each Bluetooth slave module are different such that installation positions of the four Bluetooth slave modules can be distinguished based on the level combinations of the position detection pins of the Bluetooth slave modules. The relationship between M and N is set to $2^N \geq M$ such that the quantity of position detection pins can be minimized to simplify a connection circuit.

Further, the level signal pin includes a power terminal and a ground terminal of a vehicle body power supply, to respectively correspond to a high-level signal and a low-level signal.

Further, a harness connector is disposed at the installation position of the Bluetooth slave module. The harness connector is provided with N position docking pins and N position setting pins. Each position docking pin is connected to the corresponding position setting pin. Each position setting pin of the harness connector is connected to the corresponding level signal pin. The position detection pin of the Bluetooth slave module docks with the corresponding position docking pin of the corresponding harness connector. The harness connector may be fastened at the installation position of the Bluetooth slave module in advance. The position setting pin of the harness connector is connected to the corresponding level signal pin in advance. When the Bluetooth slave module is installed, the level of the position detection pin of the Bluetooth slave module may be set by docking the position detection pin of the Bluetooth slave module with the corresponding position docking pin of the corresponding harness connector, which is very convenient.

Further, the harness connector is provided with a power docking pin and a power signal pin that are connected, a ground docking pin and a ground signal pin that are connected, and a data docking pin and a data transmission pin that are connected. A power pin of the Bluetooth slave module is docked with the power docking pin of the harness connector. A ground pin of the Bluetooth slave module is docked with the ground docking pin of the harness connector. A data pin of the Bluetooth slave module is docked with the data docking pin of the harness connector. A data pin of the Bluetooth master module is connected to the data transmission pin of the harness connector. The power signal pin of the harness connector is connected to the power terminal of the vehicle body power supply. The ground signal pin of the harness connector is connected to the ground terminal of the vehicle body power supply. The harness connector is provided with the docking pins corresponding to the pins of the Bluetooth slave module. After the Bluetooth slave module is docked with the harness connector, all pins of the Bluetooth slave module can be connected such that assembly efficiency is greatly improved.

Further, the harness connector is provided with a foolproof insertion structure to avoid an error in docking the Bluetooth slave module with the harness connector. The foolproof insertion structure has been widely used, for example, the Chinese utility model patent "Electric connector with foolproof structure and plug and socket" (Application No. 201721710468.5, filed on Dec. 11, 2017). Therefore, details of the foolproof insertion structure are not described.

Specifically, data transmission between the Bluetooth master module and each of the Bluetooth slave modules follows a local interconnect network (LIN) protocol.

The technical solution provided in this embodiment of the present application has at least the following beneficial effects.

In the present disclosure, the position detection pins are disposed on the Bluetooth slave modules and connected to signals at different levels such that address information corresponding to the installation position of each Bluetooth slave module is assigned to the Bluetooth slave module. The Bluetooth master module can accurately identify the installation position of each Bluetooth slave module. The method is suitable for identification of an installation position of a Bluetooth slave module when a plurality of Bluetooth slave modules are mixed in a vehicle.

According to a second aspect, a vehicle is provided. The vehicle includes a positioning information generation apparatus, a Bluetooth master module, a plurality of Bluetooth slave modules, and a vehicle body.

The positioning information generation apparatus and the Bluetooth master module are fastened on the vehicle body. The plurality of Bluetooth slave modules are fastened at different installation positions of the vehicle body.

The positioning information generation apparatus is electrically connected to the plurality of Bluetooth slave modules.

Each of the plurality of Bluetooth slave modules is configured to obtain positioning information which is generated by the positioning information generation apparatus and corresponds to an installation position of each of the plurality of Bluetooth slave modules; and when receiving a broadcast signal sent by a target device, each of the plurality of Bluetooth slave modules detects a signal strength value of the broadcast signal and sends the signal strength value and the positioning information sent by the positioning information generation apparatus to the Bluetooth master module.

The Bluetooth master module is configured to determine the installation position of each of the plurality of Bluetooth slave modules based on a correspondence between the installation position and the positioning information, and the positioning information sent by each of the plurality of Bluetooth slave modules, and is configured to determine a position of the target device based on the signal strength value sent by each of the plurality of Bluetooth slave modules and the installation position of each of the plurality of Bluetooth slave modules.

Further, each of the plurality of Bluetooth slave modules has one first data pin. The Bluetooth master module has a plurality of second data pins.

Each of the plurality of second data pins of the Bluetooth master module is electrically connected to the first data pin of one of the plurality of Bluetooth slave modules.

Further, each of the plurality of Bluetooth slave modules has at least one position detection pin. The positioning information generation apparatus has a high-level pin and a low-level pin.

Each position detection pin of each of the plurality of Bluetooth slave modules is electrically connected to the high-level pin or the low-level pin.

The positioning information includes a character having at least one bit. A quantity of bits in the positioning information is the same as a quantity of position detection pins of each of the plurality of Bluetooth slave modules.

The positioning information generation apparatus is configured to send a high-level signal through the high-level pin and send a low-level signal through the low-level pin.

Each of the plurality of Bluetooth slave modules is configured to determine the positioning information based on the high-level signal or the low-level signal received by each position detection pin.

Further, a quantity of the Bluetooth slave modules is M, and the quantity of position detection pins of each of the plurality of Bluetooth slave modules is N. M is an integer greater than 1, and N is an integer greater than or equal to 1 and $2^N \geq M$.

Further, the positioning information generation apparatus is a vehicle power supply. The high-level pin is a power pin of the vehicle power supply, and the low-level pin is a ground pin of the vehicle power supply.

Further, the Bluetooth slave module has a first power pin and a first ground pin. The Bluetooth master module has a second power pin and a second ground pin.

The first power pin of the Bluetooth slave module and the second power pin of the Bluetooth master module are electrically connected to the power pin of the vehicle power supply respectively. The first ground pin of the Bluetooth slave module and the second ground pin of the Bluetooth master module are electrically connected to the ground pin of the vehicle power supply respectively.

Further, data transmission between the Bluetooth master module and each of the plurality of Bluetooth slave modules follows a LIN protocol.

Further, the vehicle includes a plurality of connectors.

The plurality of connectors are fastened at different installation positions of the vehicle body respectively, are electrically connected to the positioning information generation apparatus respectively, and are electrically connected to one of the plurality of Bluetooth slave modules in an insertion manner.

Further, the Bluetooth slave module and the connector have mutually matched foolproof insertion structures.

According to a third aspect, a device positioning method is provided. The method is applied to a vehicle. The vehicle includes a positioning information generation apparatus, a Bluetooth master module, a plurality of Bluetooth slave modules, and a vehicle body.

The positioning information generation apparatus and the Bluetooth master module are fastened on the vehicle body. The plurality of Bluetooth slave modules are fastened at different installation positions of the vehicle body.

The positioning information generation apparatus is electrically connected to the plurality of Bluetooth slave modules.

The method includes:
- obtaining, by each of the plurality of Bluetooth slave modules, positioning information which is generated by the positioning information generation apparatus and corresponds to an installation position of each of the plurality of Bluetooth slave modules;
- receiving, by each of the plurality of Bluetooth slave modules, a broadcast signal sent by a target device, detecting a signal strength value of the broadcast signal, and sending the signal strength value and the positioning information received from the positioning information generation apparatus to the Bluetooth master module; and
- determining, by the Bluetooth master module, the installation position of each of the plurality of Bluetooth slave modules based on a correspondence between the installation position and the positioning information, and the positioning information sent by each of the plurality of Bluetooth slave modules, and determining a position of the target device based on the signal strength value sent by each of the plurality of Bluetooth slave modules and the installation position of each of the plurality of Bluetooth slave modules.

The technical solutions provided in the embodiments of the present application have the following beneficial effects. The Bluetooth slave module may send the positioning information received by the Bluetooth slave module and the signal strength value to the Bluetooth master module. The Bluetooth master module may determine the installation position of the Bluetooth slave module based on the positioning information and the prestored correspondence between the installation position and the positioning information, and then calculate the signal strength values detected at different installation positions to determine the position of the target device. In the present application, the Bluetooth master module may determine the installation position of each Bluetooth slave module based on the positioning information sent by the Bluetooth slave module. There is no need to determine identification information of the Bluetooth slave modules at different installation positions through a diagnosis process and send the identification information to the Bluetooth master module after the vehicle is installed. Therefore, production processes are reduced, and production efficiency is improved.

BRIEF DESCRIPTION OF DRAWINGS

To describe the technical solutions in the embodiments of the present application more clearly, the following briefly describes the accompanying drawings required for describing the embodiments. Apparently, the accompanying drawings in the following description show merely some embodiments of the present application, and those of ordinary skill in the art may still derive other drawings from these accompanying drawings without creative efforts.

DETAILED DESCRIPTION

Figure 1:
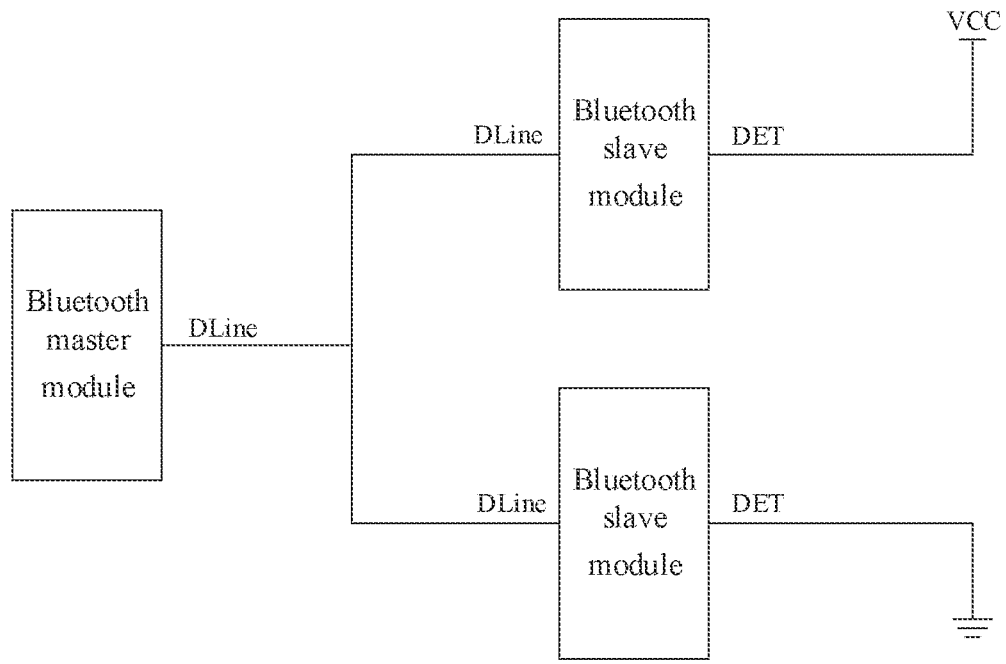
FIG. 1 is a schematic diagram of electrical connections among a Bluetooth master module and Bluetooth slave modules in Embodiment 1.

Specific embodiments of the present disclosure, such as a shape and structure of each component involved, mutual position and connection relationships between parts, functions and operating principles of the parts, are further described in detail below by describing embodiments with reference to the accompanying drawings.

A Bluetooth digital key mainly uses a near field communication technology to enable a user to perform operations such as unlocking and locking a door of a vehicle through a smartphone or a wearable intelligent device (for example, a smartwatch).

A Bluetooth digital key system may usually include an application, a Bluetooth master module, and a plurality of Bluetooth slave modules. The application may be installed on a terminal device of a vehicle owner. The vehicle owner has established a pairing connection to the Bluetooth master module through Bluetooth in the application. The Bluetooth master module and the application store a media access control (MAC) address of Bluetooth data transmission.

When the vehicle owner approaches the vehicle with the terminal device and the application on the terminal device is running, the terminal device sends a broadcast signal. The broadcast signal includes eigenvalue information of the terminal device and the MAC address. When receiving the broadcast signal, the Bluetooth master module establishes a Bluetooth pairing connection to the terminal device through the MAC address carried by the broadcast signal, and sends the eigenvalue information carried by the broadcast signal to the Bluetooth slave modules. When receiving the broadcast signal sent by the terminal device, each of the Bluetooth slave modules determines whether the eigenvalue information carried by the broadcast signal is the same as the eigenvalue information sent by the Bluetooth master module, and if yes, sends, to the Bluetooth master module, a signal strength value detected when receiving the broadcast signal sent by the terminal device.

The Bluetooth slave modules at different installation positions send signal strength values detected by themselves to the Bluetooth master module. The Bluetooth master module receives the signal strength values sent by the Bluetooth slave modules at different installation positions, and determines a position of the terminal device that sends the broadcast signal based on the installation positions of the Bluetooth slave modules and the signal strength values sent by the Bluetooth slave modules. For example, the Bluetooth master module determines whether the terminal device is currently outside or inside the vehicle and whether the terminal device is to the left or right, in front of, or behind the vehicle if outside the vehicle.

After determining a position of the terminal device of the vehicle owner, the Bluetooth master module may send the position to a control system of the vehicle. The control system of the vehicle may perform specific management and control processing on the vehicle based on a position of the vehicle owner (namely, the position of the terminal device of the vehicle owner).

That the control system performs the management and control processing may specifically be as follows: the control system forbids an engine of the vehicle from starting when determining that the vehicle owner is outside the vehicle, and allows the engine to start when determining that the vehicle owner is inside the vehicle; and when determining that the vehicle owner is outside the vehicle and at a specific position of the vehicle, the control system unlocks a door at the specific position, and unlocks doors at the other positions only after the vehicle owner opens the door at the specific position, so as to avoid that a thief opens another door when the vehicle owner does not pay attention. For example, when the terminal device is in the left front (namely, a main driver position) of the vehicle, only a door at the main driver position may be unlocked, and the other doors may be unlocked only after the vehicle owner opens the door at the main driver position.

As can be learned from the above, it is particularly important to determine the installation positions of the Bluetooth slave modules to ensure positioning accuracy of the Bluetooth master module. A method for identifying an installation position of a Bluetooth slave module in the present application is described in detail below.

Embodiment 1

This embodiment provides a method for identifying an installation position of a Bluetooth slave module, to conveniently and accurately identify an installation position of a Bluetooth slave module.

The method for identifying an installation position of a Bluetooth slave module in this embodiment is as follows: position detection pins are disposed on Bluetooth slave modules, the position detection pins of the Bluetooth slave modules at different installation positions are connected to different level signal pins when the Bluetooth slave modules are installed such that level conditions of the position detection pins of different Bluetooth slave modules are different; each of the Bluetooth slave modules sends the level condition of the position detection pin of the Bluetooth slave module to a Bluetooth master module, the Bluetooth master module compares the received level condition of the position detection pin of the Bluetooth slave module with a prestored position-level table to identify installation position information corresponding to the Bluetooth slave modules; and the position-level table is used to represent relationships among the installation positions of the Bluetooth slave modules and the level conditions of the level signal pins at the installation positions.

The level signal pin includes a power terminal and a ground terminal of a vehicle body power supply which respectively correspond to a high-level signal and a low-level signal.

During implementation, a technician may preset the relationships among the installation positions of the plurality of Bluetooth slave modules and the level conditions corresponding to the installation positions, namely, the position-level table, and store the position-level table in the Bluetooth master module. It can be understood that in the position-level table, the level conditions corresponding to different installation positions are different.

One or more position detection pins may be disposed on the Bluetooth slave module. When a Bluetooth slave module is installed at an installation position, a level condition corresponding to the installation position may be determined based on the position-level table. Then, a position detection pin of the Bluetooth slave module is connected to a corresponding level signal pin based on the level condition such that a level condition of the position detection pin of the Bluetooth slave module is the same as the level condition corresponding to the installation position in the position-level table.

In this way, the Bluetooth slave modules can send the level conditions of their position detection pins (namely, level conditions of the connected level signal pins) to the Bluetooth master module. The Bluetooth master module compares the received level conditions sent by the Bluetooth slave modules at different installation positions with the prestored position-level table to determine the installation positions of the Bluetooth slave modules.

Optionally, the level signal pins may include a high-level pin and a low-level pin. The position detection pins of the Bluetooth slave modules at different installation positions may be connected to the high-level pin or the low-level pin when the Bluetooth slave modules are installed such that each of the position detection pins is at a high level or a low level.

In this embodiment of the present application, each Bluetooth slave module corresponds to one level condition. The level condition of the position detection pins of the Bluetooth slave module is a character string. Each bit of the character string corresponds to one position detection pin of the Bluetooth slave module. A value of each bit of the character string represents a level (for example, high level or low level) of the corresponding position detection pin. For example, when a Bluetooth slave module has three position detection pins, a level condition of the position detection pins of the Bluetooth slave module may be 110, which represents that in the Bluetooth slave module, level signal pins to which the first position detection pin and the second position detection pin are connected are both high-level pins, and the level signal pin to which the third position detection pin is connected is a low-level pin.

As shown in FIG. 1, in this embodiment, there are two Bluetooth slave modules, each of which is provided with one position detection pin DET (detection). According to the position-level table, the position detection pin DET of the first Bluetooth slave module (at a left front door) is connected to the power terminal VCC (volt current condenser) of the vehicle power supply, and the position detection pin DET of the second Bluetooth slave module (at a right front door) is connected to the ground terminal GND (ground) of the vehicle power supply. Level conditions of the position detection pins DET of the two Bluetooth slave modules are different (respectively the high level and the low level) after being connected such that installation positions of the two Bluetooth slave modules can be distinguished based on the level conditions of the position detection pins of the Bluetooth slave modules.

The position-level table used in this embodiment is as follows.

| Sequence number of the Bluetooth slave module | Installation position of the Bluetooth slave module | Level condition of the position detection pin |
| --- | --- | --- |
| 1 | Left front door | High level |
| 2 | Right front door | Low level |

The first Bluetooth slave module sends the level condition (high level) of its position detection pin DET to a data pin DLine (data line) (also referred to as LIN) of the Bluetooth master module through a data pin DLine of the first Bluetooth slave module. The Bluetooth master module compares the received level condition of the position detection pin of the first Bluetooth slave module with the prestored position-level table to identify that the installation position of the first Bluetooth slave module is the left front door. Similarly, the second Bluetooth slave module sends the level condition (low level) of its position detection pin DET to the data pin DLine of the Bluetooth master module through a data pin DLine of the second Bluetooth slave module. The Bluetooth master module compares the received level condition of the position detection pin of the second Bluetooth slave module with the prestored position-level table to identify that the installation position of the second Bluetooth slave module is the right front door. In this embodiment, data transmission among the Bluetooth master module and the Bluetooth slave modules follows a LIN protocol.

Embodiment 2

This embodiment provides a method for identifying an installation position of a Bluetooth slave module, to conveniently and accurately identify an installation position of a Bluetooth slave module.

The method for identifying an installation position of a Bluetooth slave module in this embodiment is as follows: position detection pins are disposed on Bluetooth slave modules, the position detection pins of the Bluetooth slave modules at different installation positions are connected to different level signal pins when the Bluetooth slave modules are installed such that level conditions of the position detection pins of different Bluetooth slave modules are different; each of the Bluetooth slave modules compares the level condition of its position detection pin with a prestored position-level table to identify the installation position of the Bluetooth slave module, and sends installation position information of the Bluetooth slave module to a Bluetooth master module; and the position-level table is used to represent relationships among the installation positions of the Bluetooth slave modules and the level conditions of the level signal pins at the installation positions.

The level signal pin includes a power terminal and a ground terminal of a vehicle body power supply which respectively correspond to a high-level signal and a low-level signal.

A harness connector is disposed at the installation position of the Bluetooth slave module. The harness connector is provided with N position docking pins and N position setting pins. Each position docking pin is connected to the corresponding position setting pin. Each position setting pin of the harness connector is connected to the high-level pin or the low-level pin. The position detection pin of the Bluetooth slave module docks with the corresponding position docking pin of the corresponding harness connector.

During implementation, one harness connector is disposed at the installation position of each Bluetooth slave module. The harness connector is provided with N position docking pins and N position setting pins. That is, a quantity of the position docking pins and a quantity of the position setting pins are the same as a quantity of position detection pins of the Bluetooth slave module. When a harness connector is installed at an installation position, a level condition corresponding to the installation position is determined based on the position-level table. Then, each position setting pin of the harness connector is connected to the corresponding high-level pin or low-level pin such that a level condition of the position setting pin of the harness connector is the same as the level condition corresponding to the installation position in the position-level table. In the harness connector, each position setting pin is connected to the corresponding position docking pin such that a level condition of the position docking pin of the harness connector is the same as the level condition of the position setting pin, and is further the same as the level condition corresponding to the installation position.

During subsequent installation of a Bluetooth slave module, each position detection pin of the Bluetooth slave module may be connected to the corresponding position docking pin of the harness connector such that a level condition of the position detection pin of the Bluetooth slave module is the same as the level condition of the position docking pin of the harness connector at the installation position, that is, the same as the level condition corresponding to the installation position.

Figure 2:
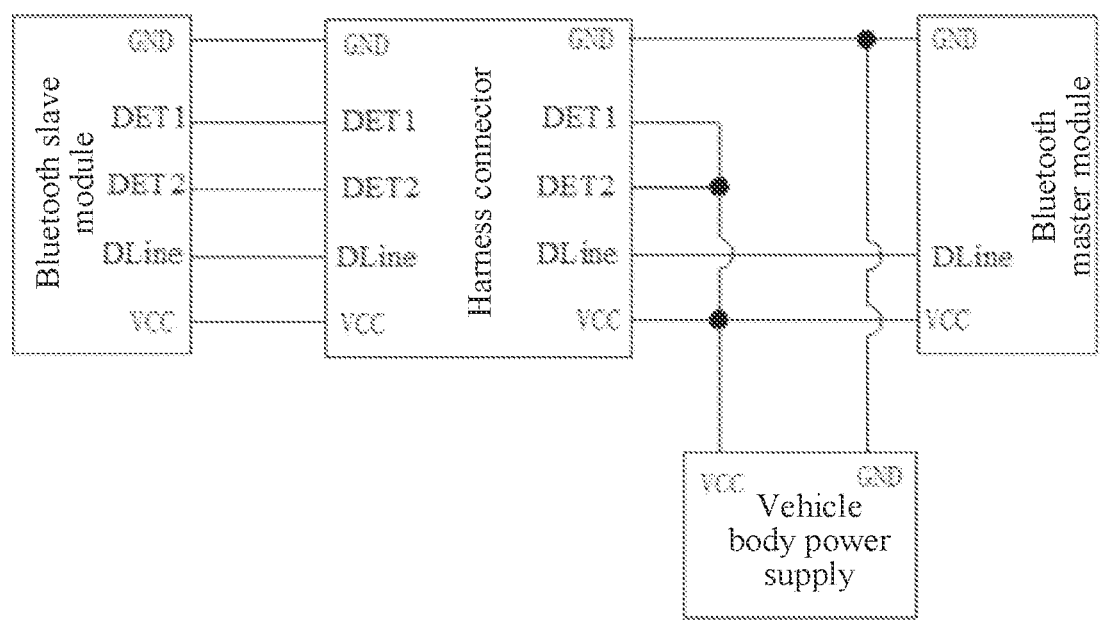
FIG. 2 is a schematic diagram of electrical connections among a Bluetooth master module, a Bluetooth slave module, a harness connector, and a vehicle body power supply in Embodiment 2.

In this embodiment, there are four Bluetooth slave modules, each of which is provided with two position detection pins DET1 and DET2. The two position detection pins DET1 and DET2 of each of the four Bluetooth slave modules are set to the following four level conditions through the level signal pins: 1. high level and high level (as shown in FIG. 2); 2. high level and low level; 3. low level and high level; and 4. low level and low level. Level combinations of the two position detection pins of each Bluetooth slave module are different such that installation positions of the four Bluetooth slave modules can be distinguished based on the level combinations of the position detection pins of the Bluetooth slave modules.

To facilitate installation, a harness connector is disposed at the installation position of the Bluetooth slave module. The harness connector is provided with two position docking pins and two position setting pins. Each position docking pin is connected to the corresponding position setting pin. Each position setting pin of the harness connector is connected to the corresponding level signal pin. The position detection pin of the Bluetooth slave module is docked with the corresponding position docking pin of the corresponding harness connector. The harness connector is further provided with a power docking pin and a power signal pin that are connected, a ground docking pin and a ground signal pin that are connected, and a data docking pin and a data transmission pin that are connected. A power pin VCC of the Bluetooth slave module is docked with the power docking pin of the harness connector. A ground pin GND of the Bluetooth slave module is docked with the ground docking pin of the harness connector. A data pin DLine of the Bluetooth slave module is docked with the data docking pin of the harness connector. A data pin DLine of the Bluetooth master module is connected to the data transmission pin of the harness connector. The power signal pin of the harness connector and a power pin of the Bluetooth master module are connected to the power terminal of the vehicle body power supply. The ground signal pin of the harness connector and a ground pin of the Bluetooth master module are connected to the ground terminal of the vehicle body power supply. For easy identification, names of the mutually docked pins of the Bluetooth slave module, the harness connector, and the Bluetooth master module in FIG. 2 are the same.

The harness connector may be fastened at the installation position of the Bluetooth slave module in advance. The position setting pins DET1 and DET2 of the harness connector are connected to the corresponding level signal pin (power terminal or ground terminal of the vehicle body power supply) in advance. The data pin DLine of the Bluetooth master module is connected to the data transmission pin of the harness connector. The power signal pin VCC of the harness connector is connected to the power terminal of the vehicle body power supply. The ground signal pin GND of the harness connector is connected to the ground terminal of the vehicle body power supply. Because the harness connector is provided with the docking pins corresponding to the pins of the Bluetooth slave module, when the Bluetooth slave module is installed, it is only necessary to dock the Bluetooth slave module with the harness connector to realize the connection of all pins of the Bluetooth slave module, thereby greatly improving the assembly efficiency.

The position-level table used in this embodiment is as follows.

| Sequence number of the Bluetooth slave module | Installation position of the Bluetooth slave module (code) | Level condition of the position detection pins (level value) |
| --- | --- | --- |
| 1 | Left front door (A) | High level and high level (11) |
| 2 | Right front door (B) | High level and low level (10) |
| 3 | Left rear door (C) | Low level and high level (01) |
| 4 | Right rear door (D) | Low level and low level (00) |

The first Bluetooth slave module (namely, the Bluetooth slave module in FIG. 2) compares the level condition (11) of its position detection pin with the prestored position-level table to identify that the installation position of the first Bluetooth slave module is the left front door, and sends installation position information (A) of the first Bluetooth slave module to the Bluetooth master module through the data pin DLine.

The second Bluetooth slave module compares the level condition (10) of its position detection pin with the prestored position-level table to identify that the installation position of the second Bluetooth slave module is the right front door, and sends installation position information (B) of the second Bluetooth slave module to the Bluetooth master module through the data pin DLine.

The third Bluetooth slave module compares the level condition (01) of its position detection pin with the prestored position-level table to identify that the installation position of the third Bluetooth slave module is the left rear door, and sends installation position information (C) of the third Bluetooth slave module to the Bluetooth master module through the data pin DLine.

The fourth Bluetooth slave module compares the level condition (00) of its position detection pin with the prestored position-level table to identify that the installation position of the fourth Bluetooth slave module is the right rear door, and sends installation position information (D) of the fourth Bluetooth slave module to the Bluetooth master module through the data pin DLine.

In this embodiment, data transmission among the Bluetooth master module and the Bluetooth slave modules follows a LIN protocol.

Embodiment 3

Figure 3:
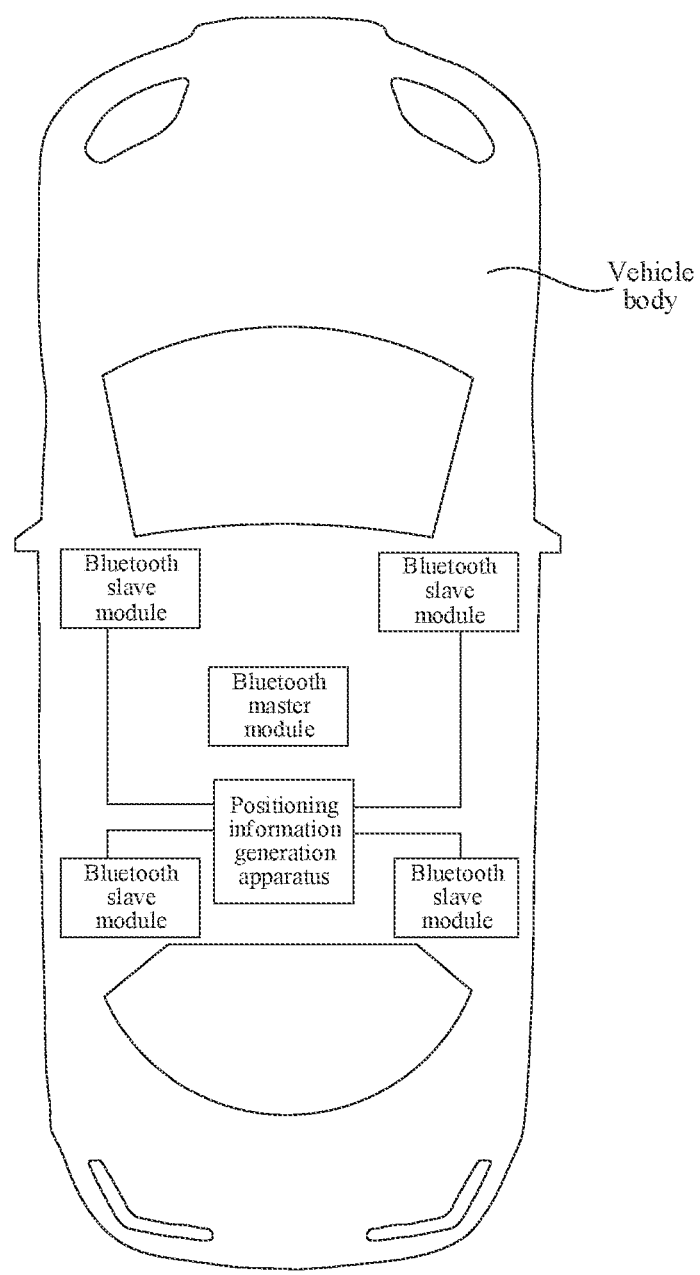
FIG. 3 is a schematic structural diagram of a vehicle according to an embodiment of the present application.

An embodiment of the present application provides a vehicle. As shown in FIG. 3, the vehicle includes a positioning information generation apparatus, a Bluetooth master module, a plurality of Bluetooth slave modules, and a vehicle body. The positioning information generation apparatus and the Bluetooth master module are fastened on the vehicle body. The plurality of Bluetooth slave modules are fastened at different installation positions of the vehicle body. The positioning information generation apparatus is electrically connected to the plurality of Bluetooth slave modules.

Bluetooth Slave Modules

A technician may determine a quantity of Bluetooth slave modules to be disposed in the vehicle based on aspects such as desired accuracy of a finally determined position of a target device and costs. In this embodiment of the present application, the quantity of Bluetooth slave modules may be any proper value, for example, 4. Certainly, the quantity may alternatively be another value. This is not limited in this embodiment of the present application.

The technician may further preset the installation positions of the plurality of Bluetooth slave modules, and set positioning information corresponding to each of the installation positions (the positioning information is equivalent to the level condition above). For example, if the quantity of Bluetooth slave modules disposed in the vehicle is 4, the installation positions of the Bluetooth slave modules may be set to a left front door, a right front door, a left rear door and a right rear door. Identifiable positioning information is set for each installation position.

The plurality of Bluetooth slave modules are fastened at the preset installation positions. One Bluetooth slave module is disposed at each installation position. A specific position at which the Bluetooth slave module is fastened may be any proper position of the vehicle body. In this embodiment of the present application, the Bluetooth slave module may be disposed on a door handle.

In this embodiment of the present application, the Bluetooth slave module is configured to: obtain positioning information which is generated by the positioning information generation apparatus and corresponds to the installation position of the Bluetooth slave module; detect a signal strength value of the broadcast signal when receiving a broadcast signal sent by the target device; and send the positioning information sent by the positioning information generation apparatus and the signal strength value to the Bluetooth master module. The target device is a terminal device of an owner of the vehicle.

During implementation, each Bluetooth slave module is electrically connected to the positioning information generation apparatus. The Bluetooth slave module may obtain the positioning information which is sent by the positioning information generation apparatus and corresponds to the installation position of the Bluetooth slave module.

When the target device is at a specific distance from the vehicle, the Bluetooth slave module may receive the broadcast signal sent by the target device, detect the signal strength value of the received broadcast signal (also referred to as an RSSI value), and send the positioning information sent by the positioning information generation apparatus and the detected signal strength value to the Bluetooth master module.

Positioning Information Generation Apparatus

The positioning information generation apparatus may be fastened at any appropriate position of the vehicle body. This is not limited in this embodiment of the present application. The positioning information generation apparatus is configured to send the positioning information corresponding to the installation position of the Bluetooth slave module to each Bluetooth slave module.

In this embodiment of the present application, each Bluetooth slave module is electrically connected to the positioning information generation apparatus. The positioning information generation apparatus may have a plurality of different pins. For other components electrically connected to the positioning information generation apparatus, different pins which are connected to the components may enable the components to receive different positioning information sent by the positioning information generation apparatus.

During assembly of the vehicle, the technician may set a circuit connected between the positioning information generation apparatus and each of the Bluetooth slave modules based on a preset correspondence among the installation position and the positioning information, such that the positioning information sent by the positioning information generation apparatus to the Bluetooth slave modules is different and the positioning information sent to the Bluetooth slave module corresponds to the installation position of the Bluetooth slave module. In other words, the preset correspondence between the installation position and the positioning information is satisfied.

Bluetooth Master Module

The Bluetooth master module may be fastened at any appropriate position of the vehicle body, for example, may be disposed in an interior cavity of the vehicle body.

The Bluetooth master module is configured to determine the installation position of each of the Bluetooth slave modules based on the positioning information sent by each of the Bluetooth slave modules and a correspondence between the installation position and the positioning information, and is configured to determine a position of the target device based on the signal strength value sent by each of the Bluetooth slave modules and the installation position of each of the Bluetooth slave modules.

During implementation, after receiving the positioning information and the signal strength value sent by each Bluetooth slave module, the Bluetooth master module may determine the installation position of each Bluetooth slave module based on the correspondence between the installation position and the positioning information prestored in the Bluetooth master module. Then, the position of the target device may be calculated based on the installation position of the Bluetooth slave module, the signal strength value sent by each Bluetooth slave module and a positioning algorithm. The positioning algorithm may be any proper algorithm, which is not limited in this embodiment of the present application.

After determining the position of the target device, the Bluetooth master module may send the position to a control system of the vehicle. The control system may perform corresponding control processing on the vehicle based on the position of the target device.

Optionally, the Bluetooth master module may further detect the corresponding signal strength value when obtaining the broadcast signal sent by the target device. After the signal strength value and the positioning information sent by each Bluetooth slave module are received, the installation position of each Bluetooth slave module may be determined based on the positioning information. Then, the position of the target device may be calculated based on the installation position of each Bluetooth slave module, the signal strength value sent by each Bluetooth slave module, a prestored installation position of the Bluetooth master module, the signal strength value detected by the Bluetooth master module and the positioning algorithm.

Figure 4:
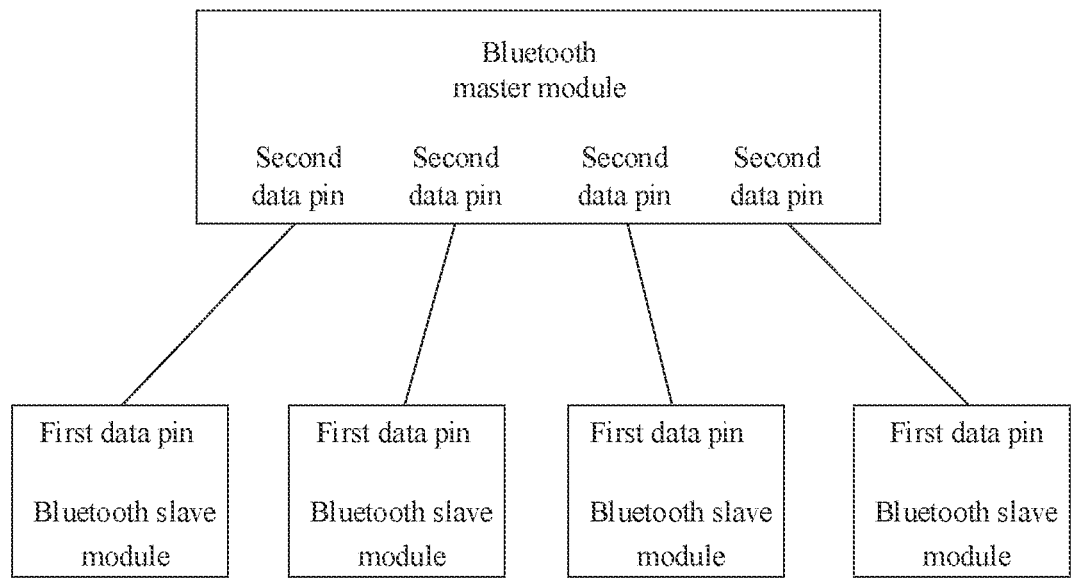
FIG. 4 is a schematic diagram of electrical connections among a Bluetooth master module and Bluetooth slave modules according to an embodiment of the present application.

Data may be transmitted among the Bluetooth master module and the plurality of Bluetooth slave modules through Bluetooth communication or wired communication. There are many wired communication modes. In this embodiment of the present application, the wired communication may be implemented by setting data pins. As shown in FIG. 4, corresponding settings may be as follows: the Bluetooth slave module has a first data pin (the first data pin is equivalent to the foregoing data pin of the Bluetooth slave module), the Bluetooth master module has a plurality of second data pins (the second data pins are equivalent to the foregoing data pins of the Bluetooth master module), and each of the second data pins of the Bluetooth master module is electrically connected to the first data pin of one of the Bluetooth slave modules. During implementation, data may be transmitted among the Bluetooth slave module and the Bluetooth master module through the first data pin and the second data pin that are electrically connected. All the first data pin and the second data pins may be LIN pins. Data transmission among the Bluetooth master module and the Bluetooth slave modules follows a LIN protocol.

Figure 5:
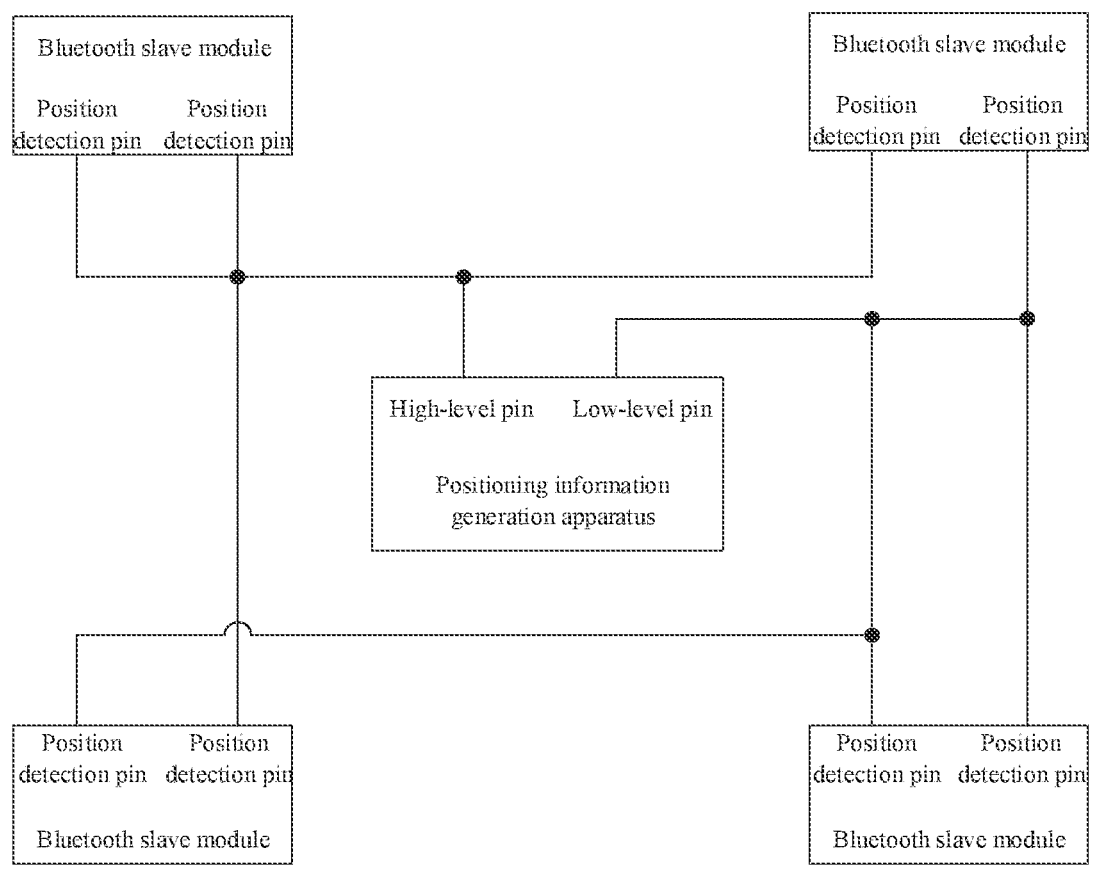
FIG. 5 is a schematic diagram of electrical connections among Bluetooth slave modules and a positioning information generation apparatus according to an embodiment of the present application.

The Bluetooth slave module and the positioning information generation apparatus may be electrically connected through pins, as shown in FIG. 5, which is described in detail below.

The Bluetooth slave module has at least one position detection pin. The positioning information generation apparatus has a high-level pin and a low-level pin. Each position detection pin of the Bluetooth slave module is electrically connected to the high-level pin or the low-level pin.

During implementation, for a Bluetooth slave module, each position detection pin of the Bluetooth slave module is electrically connected to the high-level pin or the low-level pin of the positioning information generation apparatus such that the position detection pin can receive a level signal sent by the positioning information generation apparatus. If a position detection pin is electrically connected to the high-level pin of the positioning information generation apparatus, a level condition of the position detection pin may be 1. If a position detection pin is electrically connected to the low-level pin of the positioning information generation apparatus, a level condition of the position detection pin may be 0.

In the foregoing manner, positioning information corresponding to a Bluetooth slave module can be obtained. In other words, the positioning information includes a character having at least one bit. A quantity of bits of the positioning information is the same as a quantity of position detection pins of the Bluetooth slave module.

The positioning information generation apparatus is configured to send a high-level signal through the high-level pin and send a low-level signal through the low-level pin. The Bluetooth slave module is configured to determine the positioning information based on the high-level signal or the low-level signal received by each position detection pin.

The character included in the positioning information is a level condition of the position detection pin. For a Bluetooth slave module having only one position detection pin, positioning information of the Bluetooth slave module is a level condition of the position detection pin of the Bluetooth slave module, namely, 0 or 1. For a Bluetooth slave module having a plurality of position detection pins, positioning information of the Bluetooth slave module is a character string obtained by arranging level conditions of all position detection pins of the Bluetooth slave module in a preset sequence.

For example, the Bluetooth slave module has three position detection pins. The first position detection pin and the third position detection pin are both electrically connected to the high-level pin, and the second position detection pin is electrically connected to the low-level pin. The positioning information of the Bluetooth slave module is 101.

For another example, in four Bluetooth slave modules shown in FIG. 5, each Bluetooth slave module has two position detection pins. Each position detection pin of each Bluetooth slave module is electrically connected to the high-level pin or the low-level pin such that positioning information of the four Bluetooth slave modules is 11, 10, 01, and 00.

The quantity of position detection pins of each Bluetooth slave module is related to the quantity of Bluetooth slave modules. If the quantity of Bluetooth slave modules is M and the quantity of position detection pins of each Bluetooth slave module is N, a relationship between M and N may be $2^N \geq M$. M is an integer greater than 1 and N is an integer greater than or equal to 1. For example, when two Bluetooth slave modules at different installation positions need to be disposed, the quantity of position detection pins of each Bluetooth slave module is at least one. When four Bluetooth slave modules at different installation positions need to be disposed, the quantity of position detection pins of each Bluetooth slave module is at least two.

The positioning information generation apparatus may be a separate apparatus or an apparatus disposed in the vehicle. For example, the positioning information generation apparatus may be a vehicle power supply (the vehicle power supply herein is equivalent to the foregoing vehicle body power supply). The high-level pin of the positioning information generation apparatus may be a power pin of the vehicle power supply (the power pin herein is equivalent to the foregoing power pin). The low-level pin of the positioning information generation apparatus may be a ground pin of the vehicle power supply (the ground pin herein is equivalent to the foregoing ground pin). During assembly of the vehicle, the position detection pin of the Bluetooth slave module may be electrically connected to the power pin or the ground pin.

In addition, the Bluetooth slave module and the Bluetooth master module need to be connected to the vehicle power supply to ensure power supply, and need to be connected to the ground pin to enhance security of electrical connections. Corresponding settings may be as follows.

The Bluetooth slave module has a first power pin (the first power pin herein corresponds to the foregoing power pin of the Bluetooth slave module) and a first ground pin (the first ground pin herein corresponds to the foregoing ground pin of the Bluetooth slave module). The Bluetooth master module has a second power pin (the second power pin herein corresponds to the foregoing power pin of the Bluetooth master module) and a second ground pin (the second ground pin herein corresponds to the foregoing ground pin of the Bluetooth master module). The first power pin of the Bluetooth slave module and the second power pin of the Bluetooth master module are electrically connected to the power pin of the vehicle power supply. The first ground pin of the Bluetooth slave module and the second ground pin of the Bluetooth master module are electrically connected to the ground pin of the vehicle power supply.

To facilitate installation of the Bluetooth slave module, the vehicle in this embodiment of the present application may further be provided with a plurality of connectors. Corresponding processing may be as follows: the vehicle further includes a plurality of connectors, the plurality of connectors are fastened at different installation positions of the vehicle body, each of the plurality of connectors is electrically connected to the positioning information generation apparatus, and each of the plurality of connectors is electrically connected to one of the Bluetooth slave modules in an insertion manner.

During implementation, when circuits of the vehicle are installed, a connector may be disposed at each preset installation position of the vehicle. Each of the plurality of connectors is electrically connected to the positioning information generation apparatus and then each of the plurality of Bluetooth slave modules is electrically connected to one connector in an insertion manner such that the Bluetooth slave modules can be electrically connected to the positioning information generation apparatus through the connectors.

To facilitate the connection between the Bluetooth slave module and the connector in an insertion manner, mutually matched foolproof insertion structures may further be disposed.

The Bluetooth slave module has the position detection pin, the first power pin, the first ground pin, or the first data pin. Correspondingly, the connector may also be provided with different pins to implement electrical connections to the Bluetooth slave module, the positioning information generation apparatus, and the Bluetooth master module. Corresponding settings may be as follows.

The connector has at least one position docking pin, at least one position setting pin, a power signal pin, a power docking pin, a ground signal pin, a ground docking pin, a data transmission pin, and a data docking pin.

For a connector, a quantity of position docking pins is the same as that of position setting pins, and is also the same as that of position detection pins of the Bluetooth slave module. Each position docking pin is electrically connected to one position setting pin. The power signal pin is electrically connected to the power docking pin. The ground signal pin is electrically connected to the ground docking pin. The data transmission pin is electrically connected to the data docking pin.

Settings for implementing information transmission between the Bluetooth slave module and the positioning information generation apparatus through the connector may be as follows: the connector and the Bluetooth slave module disposed at one installation position are taken for an example, each position docking pin of the connector is electrically connected to one position detection pin of the Bluetooth slave module, and each position setting pin of the connector is electrically connected to the high-level pin or the low-level pin of the positioning information generation apparatus, such that the positioning information generation apparatus can send positioning information corresponding to the installation position to the Bluetooth slave module through the electrical connections among the level pin (the high-level pin and/or the low-level pin), the position setting pin, the position docking pin, and the position detection pin.

Settings for meeting a power supply requirement and a grounding requirement of the Bluetooth slave module through the connector may be as follows: the power docking pin of the connector is electrically connected to the first power pin of the Bluetooth slave module, and the power signal pin of the connector is electrically connected to the power pin of the vehicle power supply, such that the power supply requirement of the Bluetooth slave module can be met through the electrical connections among the power pin, the power signal pin, the power docking pin, and the first power pin; and the ground docking pin of the connector is electrically connected to the first ground pin of the Bluetooth slave module, and the ground signal pin of the connector is electrically connected to the ground pin of the vehicle power supply, such that the grounding requirement of the Bluetooth slave module can be met through the electrical connections among the ground pin, the ground signal pin, the ground docking pin, and the first ground pin.

Settings for implementing data transmission between the Bluetooth slave module and the Bluetooth master module through the connector may be as follows: the data docking pin of the connector is electrically connected to the first data pin of the Bluetooth slave module, and the data transmission pin of the connector is electrically connected to the second data pin of the Bluetooth master module, such that data transmission between the Bluetooth slave module and the Bluetooth master module can be implemented through the electrical connections among the first data pin, the data docking pin, the data transmission pin, and the second data pin.

The following describes this embodiment of the present application by using an example in which four Bluetooth slave modules are disposed.

Four Bluetooth slave modules are disposed in the vehicle. Each Bluetooth slave module has two position detection pins (namely, DET1 and DET2), one first power pin (namely, VCC), one first ground pin (namely, GND), and one first data pin (namely, LIN). To facilitate observation, the position docking pin and position setting pin of the connector are also denoted by DET1 and DET2. The power signal pin and power docking pin of the connector, the second power pin of the Bluetooth master module, and the power pin of the vehicle power supply are also denoted by LIN. The ground signal pin and ground docking pin of the connector, the second ground pin of the Bluetooth master module, and the ground pin of the vehicle power supply are also denoted by GND. The second data pin of the Bluetooth master module are also denoted by LIN1, LIN2, LIN3, and LIN4, respectively.

Correspondences between prestored installation positions and positioning information may be as shown in the following table.

| Installation position | Positioning information |
|---|---|
| Left front door | 11 |
| Right front door | 10 |
| Left rear door | 01 |
| Right rear door | 00 |

In FIG. 6 to FIG. 10, the left front door is denoted by A, the right front door is denoted by B, the left rear door is denoted by C, and the right rear door is denoted by D.

Figure 6:
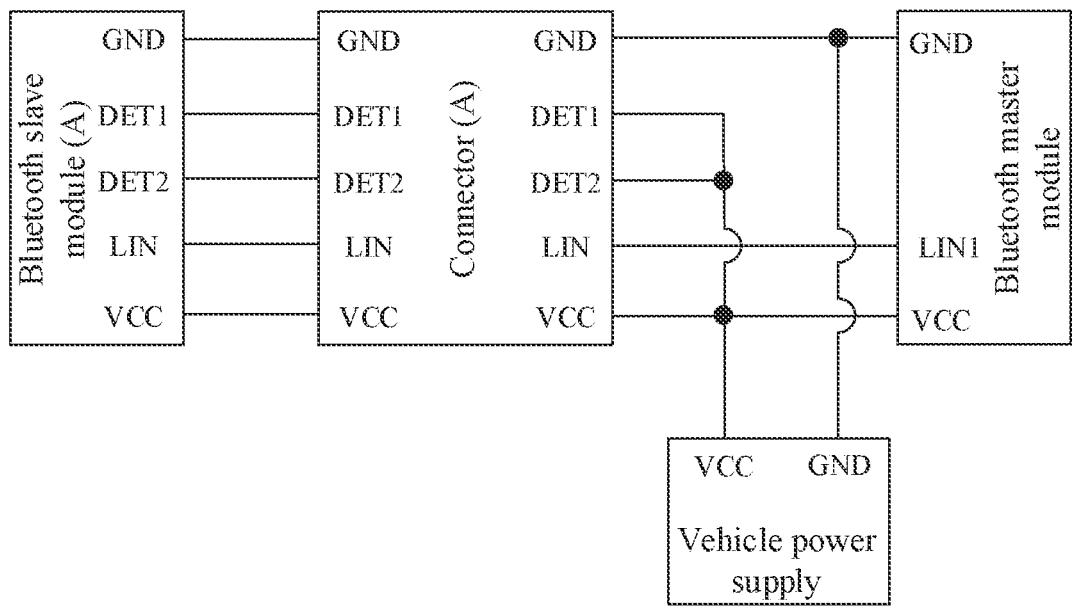
FIG. 6 is a schematic diagram of electrical connections among a Bluetooth master module, a Bluetooth slave module, a connector, and a vehicle power supply according to an embodiment of the present application.

FIG. 6 is a schematic diagram of electrical connections among the Bluetooth slave module at the installation position of the left front door, the connector, the Bluetooth master module, and the vehicle power supply. The two pins DET1 and DET2 of the Bluetooth slave module (A) are both electrically connected to VCC of the vehicle power supply. Therefore, the positioning information sent by the vehicle power supply to the Bluetooth slave module (A) is 11.

Figure 7:
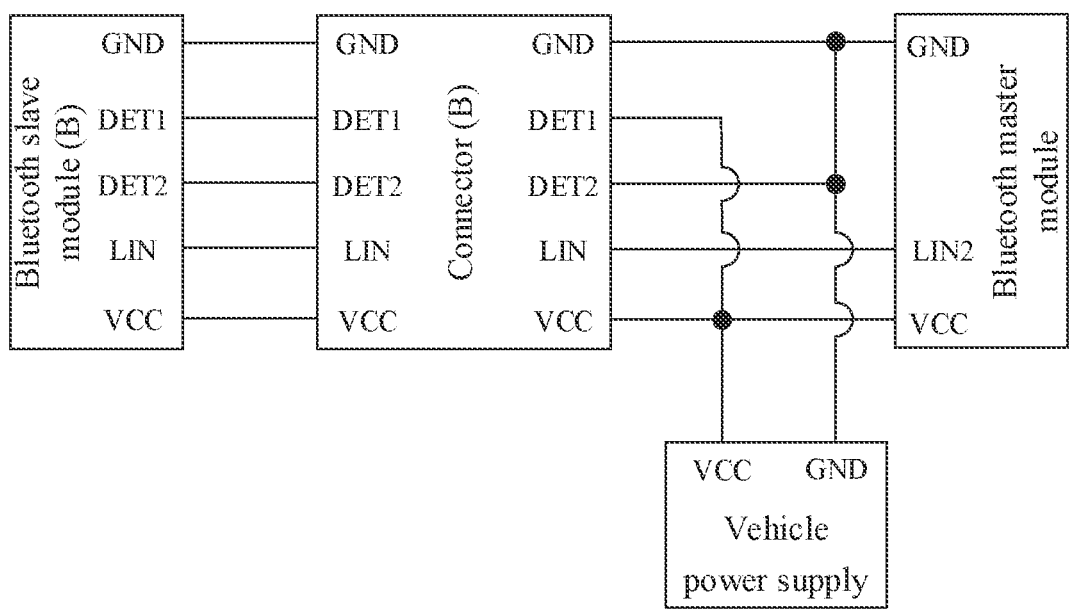
FIG. 7 is a schematic diagram of electrical connections among a Bluetooth master module, a Bluetooth slave module, a connector, and a vehicle power supply according to an embodiment of the present application.

FIG. 7 is a schematic diagram of electrical connections among the Bluetooth slave module at the installation position of the right front door, the connector, the Bluetooth master module, and the vehicle power supply. DET1 of the Bluetooth slave module (B) is electrically connected to VCC of the vehicle power supply, and DET2 is electrically connected to GND of the vehicle power supply. Therefore, the positioning information sent by the vehicle power supply to the Bluetooth slave module (B) is 10.

Figure 8:
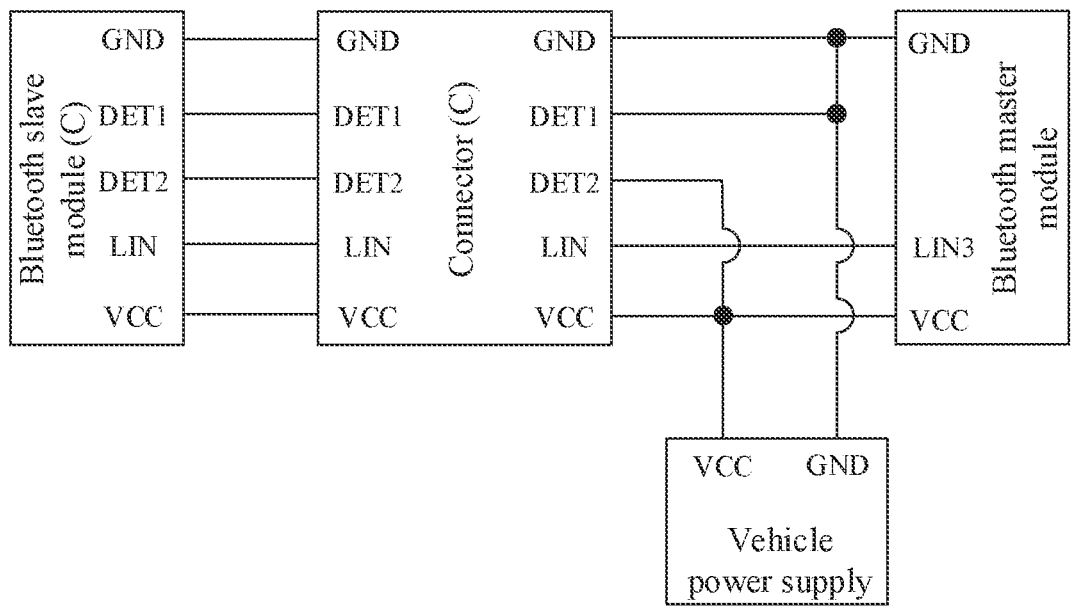
FIG. 8 is a schematic diagram of electrical connections among a Bluetooth master module, a Bluetooth slave module, a connector, and a vehicle power supply according to an embodiment of the present application.

FIG. 8 is a schematic diagram of electrical connections among the Bluetooth slave module at the installation position of the left rear door, the connector, the Bluetooth master module, and the vehicle power supply. DET1 of the Bluetooth slave module (C) is electrically connected to GND of the vehicle power supply, and DET2 is electrically connected to VCC of the vehicle power supply. Therefore, the positioning information sent by the vehicle power supply to the Bluetooth slave module (C) is 01.

Figure 9:
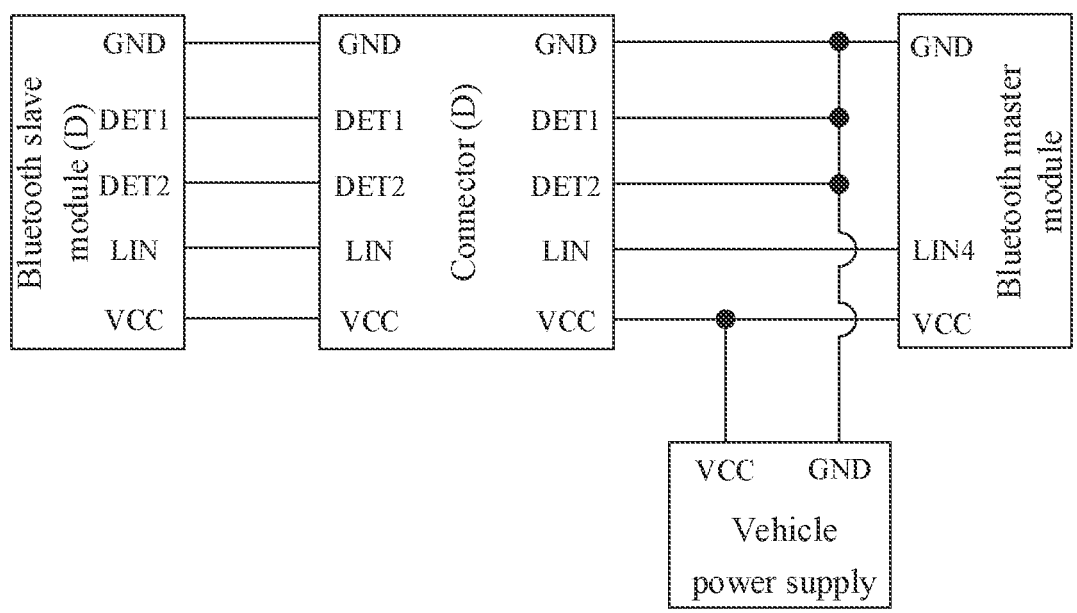
FIG. 9 is a schematic diagram of electrical connections among a Bluetooth master module, a Bluetooth slave module, a connector, and a vehicle power supply according to an embodiment of the present application.

FIG. 9 is a schematic diagram of electrical connections among the Bluetooth slave module at the installation position of the right rear door, the connector, the Bluetooth master module, and the vehicle power supply. The two pins DET1 and DET2 of the Bluetooth slave module (D) are both electrically connected to GND of the vehicle power supply. Therefore, the positioning information sent by the vehicle power supply to the Bluetooth slave module (D) is 00.

Figure 10:
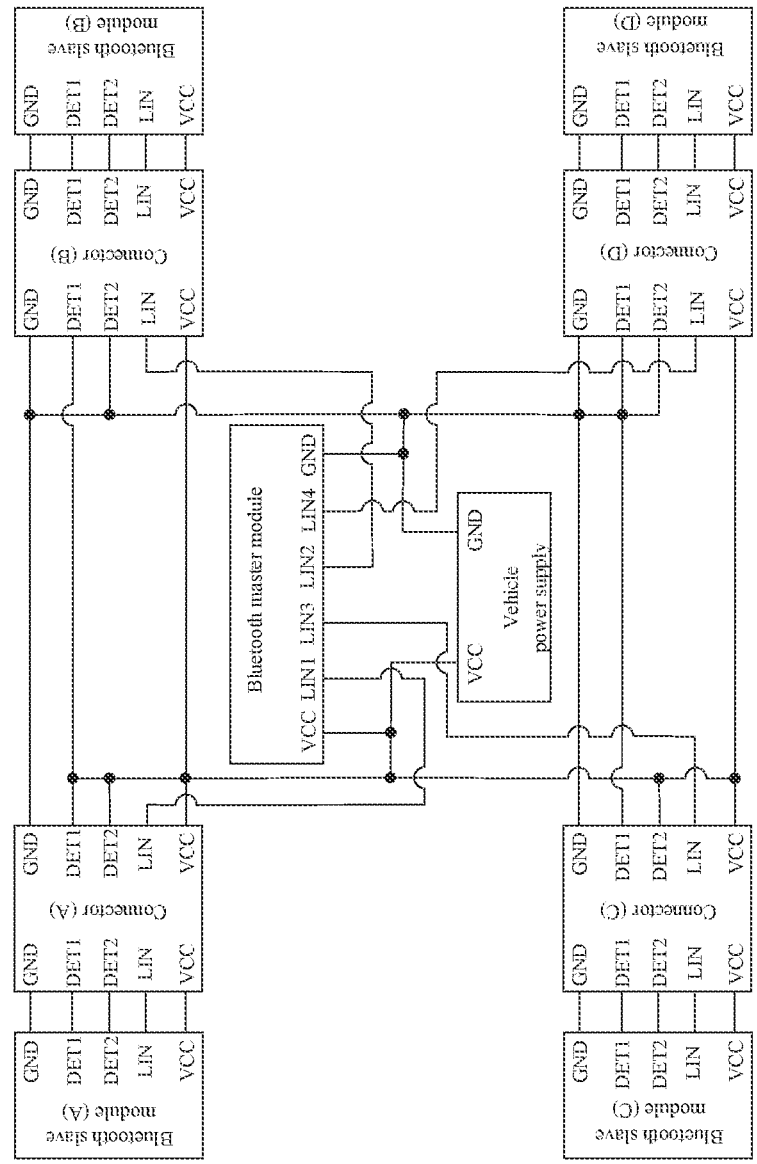
FIG. 10 is a schematic diagram of electrical connections among a Bluetooth master module, Bluetooth slave modules, connectors, and a vehicle power supply according to an embodiment of the present application.

FIG. 10 is a schematic diagram of electrical connections among four Bluetooth slave modules, four connectors, the Bluetooth master module, and the vehicle power supply.

After receiving signal strength values and positioning information sent by the four Bluetooth slave modules, the Bluetooth master module determines the installation position of each Bluetooth slave module based on the correspondence between the positioning information and the installation position and the positioning information sent by each Bluetooth slave module, and then calculates the position of the target device based on the installation position of and the signal strength value sent by each Bluetooth slave module.

An embodiment of the present application provides a device positioning method. The method is applied to a vehicle. The vehicle includes a positioning information generation apparatus, a Bluetooth master module, a plurality of Bluetooth slave modules, and a vehicle body. The positioning information generation apparatus and the Bluetooth master module are fastened on the vehicle body. The plurality of Bluetooth slave modules are fastened at different installation positions of the vehicle body. The positioning information generation apparatus is electrically connected to the plurality of Bluetooth slave modules.

The device positioning method includes the following steps.

The Bluetooth slave module obtains positioning information generated by the positioning information generation apparatus and corresponding to the installation position of the Bluetooth slave module. The Bluetooth slave module receives a broadcast signal sent by a target device, detects a signal strength value of the broadcast signal, and sends the positioning information sent by the positioning information generation apparatus and the signal strength value to the Bluetooth master module. The Bluetooth master module determines the installation position of the Bluetooth slave module based on a correspondence between the installation position and the positioning information, and the positioning information sent by the Bluetooth slave module, and determines a position of the target device based on the signal strength value sent by each of the Bluetooth slave modules and the installation position of each of the Bluetooth slave modules.

During implementation, the positioning information generation apparatus may send the positioning information corresponding to the installation position of the Bluetooth slave module to each of the Bluetooth slave modules.

When the target device is close to the vehicle, the Bluetooth master module may establish a Bluetooth pairing connection to the target device. Then, the target device sends the broadcast signal. The broadcast signal carries eigenvalue information of the target device. After receiving the broadcast signal, the Bluetooth master module may send the eigenvalue information to the Bluetooth slave modules.

After receiving the broadcast signal, the Bluetooth slave module compares the eigenvalue information carried in the broadcast signal with the eigenvalue information sent by the Bluetooth master module. If the eigenvalue information is the same, the broadcast signal is from the target device, and the Bluetooth slave module may send the detected signal strength value of the broadcast signal and the positioning information sent by the positioning information generation apparatus to the Bluetooth master module.

After receiving the signal strength value and the positioning information sent by each Bluetooth slave module, the Bluetooth master module may determine the installation position of the Bluetooth slave module based on the prestored correspondence between the installation position and the positioning information, and the positioning information sent by the Bluetooth slave module. Then, the position of the target device is determined based on the installation position of each Bluetooth slave module, the signal strength value sent by each Bluetooth slave module, and a positioning algorithm.

Optionally, the Bluetooth master module may further detect the signal strength value of the broadcast signal sent by the target device. After receiving the signal strength value and the positioning information sent by each Bluetooth slave module, the Bluetooth master module determines the installation position of each Bluetooth slave module, and then determines the position of the target device based on the installation position of each Bluetooth slave module, the signal strength value sent by each Bluetooth slave module, a prestored installation position of the Bluetooth master module, the signal strength value detected by the Bluetooth master module, and the positioning algorithm.

The technical solutions provided in the embodiments of the present application have the following beneficial effects. The Bluetooth slave module may send the positioning information received by the Bluetooth slave module and the signal strength value to the Bluetooth master module. The Bluetooth master module may determine the installation position of the Bluetooth slave module based on the positioning information and the prestored correspondence between the installation position and the positioning information, and then calculate the signal strength values detected at different installation positions to determine the position of the target device. In the present application, the Bluetooth master module may determine the installation position of each Bluetooth slave module based on the positioning information sent by the Bluetooth slave module. There is no need to determine identification information of the Bluetooth slave modules at different installation positions through a diagnosis process and send the identification information to the Bluetooth master module after the vehicle is installed. Therefore, production processes are reduced, and production efficiency is improved.

The present disclosure has been exemplarily described with reference to the accompanying drawings above. Apparently, the specific design of the present disclosure is not limited by the foregoing manner Various non-substantial improvements made by using the concept and technical solutions of the present disclosure or direct application of the concept and the technical solutions of the present disclosure to other occasions without improvement shall fall within the protection scope of the present disclosure.

Those of ordinary skill in the art can understand that all or some of the steps in the foregoing embodiments may be implemented by hardware, or by instructing related hardware by using a program. The program may be stored in a computer-readable storage medium. The storage medium may be a read-only memory, a disk, a compact disc, or the like.

The foregoing descriptions are merely preferred embodiments of the present application and are not intended to limit the present application. Any modification, equivalent replacement, and improvement within the spirit and principle of the present application shall be included within the protection scope of the present application.

What is claimed is:

1. A vehicle, comprising:
a positioning information generation apparatus;
a Bluetooth master module;
a plurality of Bluetooth slave modules; and
a vehicle body;
wherein the positioning information generation apparatus and the Bluetooth master module are fastened on the vehicle body, and the plurality of Bluetooth slave modules are fastened at different installation positions of the vehicle body, and each of the plurality of Bluetooth slave modules has at least one position detection pin, and the at least one position detection pin of the plurality of Bluetooth slave modules at different installation positions are connected to different level signal pins;
wherein the positioning information generation apparatus is electrically connected to the plurality of Bluetooth slave modules, and the positioning information generation apparatus is configured to send a level signal to the at least one position detection pin to generate positioning information, wherein the positioning information corresponds to an installation position of each of the plurality of Bluetooth slave modules and comprises a level condition of the at least one position detection pin;

wherein each of the plurality of Bluetooth slave modules is configured to obtain the positioning information; and when receiving a broadcast signal sent by a target device, each of the plurality of Bluetooth slave modules detects a signal strength value of the broadcast signal and sends the signal strength value and the positioning information to the Bluetooth master module; and wherein the Bluetooth master module is configured to determine the installation position of each of the plurality of Bluetooth slave modules based on a prestored position-level table, and the positioning information sent by each of the plurality of Bluetooth slave modules, and is configured to determine a position of the target device based on the signal strength value sent by each of the plurality of Bluetooth slave modules and the installation position of each of the plurality of Bluetooth slave modules.

2. The vehicle according to claim 1, wherein each of the plurality of Bluetooth slave modules has one first data pin, and the Bluetooth master module has a plurality of second data pins; and wherein each of the plurality of second data pins of the Bluetooth master module is electrically connected to the first data pin of one of the plurality of Bluetooth slave modules.

3. The vehicle according to claim 2, wherein data transmission between the Bluetooth master module and each of the plurality of Bluetooth slave modules follows a local interconnect network (LIN) protocol.

4. The vehicle according to claim 1, wherein the positioning information generation apparatus has a high-level pin and a low-level pin;

wherein each position detection pin of each of the plurality of Bluetooth slave modules is electrically connected to the high-level pin or the low-level pin;

wherein the positioning information comprises a character having at least one bit, and a quantity of bits in the positioning information is the same as a quantity of position detection pins of each of the plurality of Bluetooth slave modules;

wherein the positioning information generation apparatus is configured to send a high-level signal through the high-level pin and send a low-level signal through the low-level pin; and wherein each of the plurality of Bluetooth slave modules is configured to determine the positioning information based on the high-level signal or the low-level signal received by each position detection pin.

5. The vehicle according to claim 4, wherein a quantity of the Bluetooth slave modules is M, the quantity of position detection pins of each of the plurality of Bluetooth slave modules is N, M is an integer greater than 1, N is an integer greater than or equal to 1, and $2^N \geq M$.

6. The vehicle according to claim 4, wherein the positioning information generation apparatus is a vehicle power supply, the high-level pin is a power pin of the vehicle power supply, and the low-level pin is a ground pin of the vehicle power supply.

7. The vehicle according to claim 6, wherein the Bluetooth slave module has a first power pin and a first ground pin, and the Bluetooth master module has a second power pin and a second ground pin; and wherein the first power pin of the Bluetooth slave module and the second power pin of the Bluetooth master module are electrically connected to the power pin of the vehicle power supply respectively, and the first ground pin of the Bluetooth slave module and the second ground pin of the Bluetooth master module are electrically connected to the ground pin of the vehicle power supply respectively.

8. The vehicle according to claim 1, wherein the vehicle further comprises a plurality of connectors;

wherein the plurality of connectors are fastened at different installation positions of the vehicle body respectively, are electrically connected to the positioning information generation apparatus respectively, and are electrically connected to one of the plurality of Bluetooth slave modules in an insertion manner.

9. The vehicle according to claim 8, wherein the Bluetooth slave module and the connector have mutually matched foolproof insertion structures.

10. A device positioning method, applied to a vehicle, wherein the vehicle comprises a positioning information generation apparatus, a Bluetooth master module, a plurality of Bluetooth slave modules, and a vehicle body, the positioning information generation apparatus and the Bluetooth master module are fastened on the vehicle body, and the plurality of Bluetooth slave modules are fastened at different installation positions of the vehicle body; and the positioning information generation apparatus is electrically connected to the plurality of Bluetooth slave modules, and each of the plurality of Bluetooth slave modules has at least one position detection pin, and the at least one position detection pin of the plurality of Bluetooth slave modules at different installation positions are connected to different level signal pins, the method comprising:

sending a level signal to the at least one position detection pin, by the positioning information generation apparatus, to generate positioning information, wherein the positioning information corresponds to an installation position of each of the plurality of Bluetooth slave modules and comprises a level condition of the at least one position detection pin;

obtaining, by each of the plurality of Bluetooth slave modules, the positioning information;

receiving, by each of the plurality of Bluetooth slave modules, a broadcast signal sent by a target device, detecting a signal strength value of the broadcast signal, and sending the signal strength value and the positioning information to the Bluetooth master module; and determining, by the Bluetooth master module, the installation position of each of the plurality of Bluetooth slave modules based on a prestored position-level table, and the positioning information, and determining a position of the target device based on the signal strength value sent by each of the plurality of Bluetooth slave modules and the installation position of each of the plurality of Bluetooth slave modules.

* * * * *